United States Patent
Ravichandran et al.

(10) Patent No.: US 9,575,219 B2
(45) Date of Patent: Feb. 21, 2017

(54) ULTRA-HIGH DENSIFICATION OF ZNS FOR NANO-GRAIN OPTICAL WINDOWS

(76) Inventors: Duraiswamy Ravichandran, College Station, TX (US); Devan Balachari, College Station, TX (US)

(*) Notice: Subject to any disclaimer, the term of this patent is extended or adjusted under 35 U.S.C. 154(b) by 169 days.

(21) Appl. No.: 13/371,187

(22) Filed: Feb. 10, 2012

(65) Prior Publication Data

US 2012/0205540 A1    Aug. 16, 2012

Related U.S. Application Data

(60) Provisional application No. 61/463,039, filed on Feb. 11, 2011.

(51) Int. Cl.
  *G02B 1/12*   (2006.01)
  *B82Y 20/00*  (2011.01)
  *B82Y 30/00*  (2011.01)

(52) U.S. Cl.
  CPC .............. *G02B 1/12* (2013.01); *B82Y 20/00* (2013.01); *B82Y 30/00* (2013.01); *G02B 2207/101* (2013.01); *Y10T 428/25* (2015.01)

(58) Field of Classification Search
  CPC ........... B82Y 20/00; B82Y 30/00; G02B 1/12; G02B 2207/101; Y10T 428/25
  USPC ....................................................... 250/330
  See application file for complete search history.

(56) References Cited

U.S. PATENT DOCUMENTS

| | | | |
|---|---|---|---|
| 4,357,427 A | 11/1982 | Ho et al. | |
| 4,717,822 A | 1/1988 | Byren | |
| 4,864,137 A | 9/1989 | Klein | |
| 5,119,232 A | 6/1992 | Daley et al. | |
| 5,302,306 A * | 4/1994 | Nagata et al. | ............ 252/62.62 |
| 5,365,345 A | 11/1994 | Propst et al. | |
| 5,398,133 A | 3/1995 | Tsai et al. | |
| 5,488,371 A | 1/1996 | Targove | |
| 5,608,515 A | 3/1997 | Shu et al. | |
| 5,629,074 A | 5/1997 | Klocek et al. | |
| 5,643,505 A | 7/1997 | Harris et al. | |
| 5,658,504 A | 8/1997 | Shibata et al. | |
| 5,702,654 A | 12/1997 | Chen et al. | |
| 5,712,724 A | 1/1998 | Klocek et al. | |
| 5,786,287 A | 7/1998 | Bayya et al. | |
| 5,935,723 A | 8/1999 | Borden | |
| 6,144,031 A | 11/2000 | Herring et al. | |
| 6,287,478 B1 | 9/2001 | Klocek | |
| 6,592,798 B1 | 7/2003 | Omori et al. | |
| 7,148,480 B2 * | 12/2006 | Zhan et al. | ................ 250/338.1 |
| 7,808,632 B2 | 10/2010 | Vaidya et al. | |
| 2011/0030440 A1 * | 2/2011 | Keane et al. | ................... 72/274 |

OTHER PUBLICATIONS

Savage, J.A., "Infrared Optical Materials and Their Antireflection Coatings"; Adam Hilger LTD, Bristol and Boston, 1985; pp. 95-111.

(Continued)

*Primary Examiner* — Marcus Taningco

(57) ABSTRACT

A method is provided for producing an article which is transparent to infrared radiation. The method includes the steps of (a) disposing a plurality of nanoparticles on a substrate, wherein said nanoparticles comprise a metal sulfide or a metal selenide; (b) subjecting the nanoparticles to spark plasma sintering, thereby producing a sintered product; and (c) removing the sintered product from the substrate as a self-supporting mass.

6 Claims, 3 Drawing Sheets

(56) References Cited

OTHER PUBLICATIONS

Block, S. et al.; Pressure Sintering and Transformation Toughening of Zinc Sulfide; Materials Science and Engineering, A127; 1990; pp. 99-104.
Yashina, E.V.; "Preparation and Properties of Polycrystalline ZnS for IR Applications"; Inorganic Materials, vol. 39, No. 7, 2003; pp. 663-668.
Harris, Daniel C.; "Development of hot-pressed and chemical-vapor-deposited zinc sulfide and zinc selenide in the United States for optical windows"; SPIE, vol. 6545, 2007; 27 pages.
Chlique, C. et al.; A comparative study of ZnS powders sintering by Hot Uniaxial Pressing (HUP) and Spark Plasma Sintering (SPS); Optical Materials; 33; 2011; pp. 706-712.
Mroz and Goldman, "Nanostructured, Infrared-Transparent Magnesium-Aluminate Spinel with Superior Mechanical Properties"; Int. J. Appl. Ceram., Technol. 9 (1); 2012, pp. 83-90.

* cited by examiner

ULTRA-HIGH DENSIFICATION OF ZNS FOR NANO-GRAIN OPTICAL WINDOWS

CROSS-REFERENCE TO RELATED APPLICATION

This application claims the benefit of U.S. provisional application No. 61/463,039 filed Feb. 11, 2011, having the same inventors and the same title, and incorporated herein by reference in its entirety.

FIELD OF THE DISCLOSURE

The present application relates generally to the production of materials for infrared optical windows, and more specifically to methods for the densification of ZnS for the production of nano-grain optical windows.

BACKGROUND OF THE DISCLOSURE

Kodak and others demonstrated the production of zinc sulfide (ZnS) windows years ago by hot pressing ceramic powders. This method was subsequently replaced by a chemical vapor deposition (CVD) process in military applications where cost was not an important consideration. The CVD process is advantageous in that it allows ZnS windows to be fabricated in larger, flat or curved geometries which readily conform to the shape of aircraft.

Optical grade ZnS may be deposited or grown in a fully dense state by the CVD process. The resulting ZnS is polycrystalline and orange in color. Although this CVD-processed ZnS is transparent over a portion (about 0.5 to 12 microns) of the infrared region, it has poor transmittance in the visible region of the spectrum, due to scattering effects. This shortcoming may be addressed by annealing the ZnS. Thus, the transparency of the CVD-processed ZnS may be improved, in both the visible and infra-red regions of the electromagnetic spectrum, by subjecting the material to a hot, isostatic press (HIP). The ZnS formed by this process is sometimes referred to as "multispectral" ZnS.

SUMMARY OF THE DISCLOSURE

Figure 1:
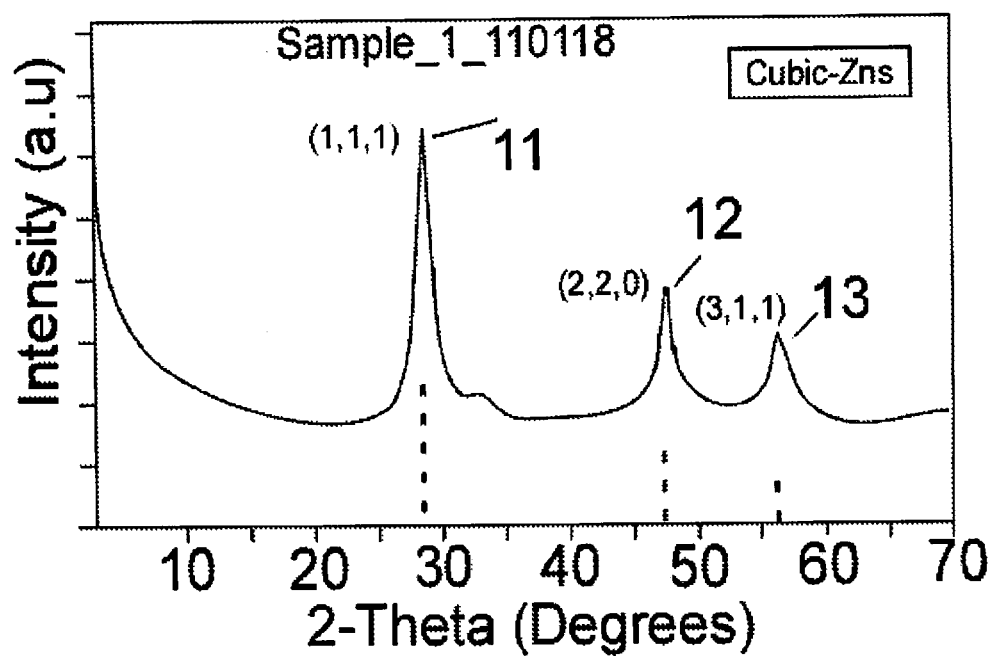
FIG. 1 shows X-ray diffraction peaks for samples of ZnS nanoparticles which were subjected to powder X-ray diffraction (XRD) prior to their use in the methodologies described herein.

In one aspect, a method for producing an article which is transparent to infrared radiation is provided. The method comprises (a) disposing a plurality of nanoparticles on a substrate, wherein said nanoparticles comprise a metal sulfide or a metal selenide; (b) subjecting the nanoparticles to spark plasma sintering, thereby producing a sintered product; and (c) removing the sintered product from the substrate as a self-supporting mass.

In another aspect, a method for producing an optical window which is transparent to infrared radiation is provided. The method comprises (a) disposing a plurality of nanoparticles in a conductive mold, wherein said nanoparticles comprise zinc sulfide; (b) subjecting the nanoparticles to spark plasma sintering, thereby producing a sintered product; and (d) removing the sintered product from the mold as a self-supporting article.

In a further aspect, an infrared imaging device which captures infrared images through an optical window is provided. The window comprises a material derived by sintering a plurality of nanoparticles selected from the group consisting of metal sulfides and metal selenides.

In still another aspect, an optical element is provided which comprises a material derived by sintering a plurality of nanoparticles selected from the group consisting of metal sulfides and metal selenides.

In yet another aspect, an article is provided which comprises a self-supporting mass derived by sintering a plurality of nanoparticles, wherein said self-supporting mass has nano-grains with an average maximum dimension within the range of about 100 nm to about 800 nm.

DETAILED DESCRIPTION

As noted above, the transparency of CVD-processed ZnS may be improved by subjecting the material to a hot, isostatic press (HIP). However, use of the HIP process has at least one significant drawback. In particular, subjecting CVD-processed ZnS to the elevated pressures and temperatures attendant to the HIP process causes grain growth in the material, which has been attributed to the removal of the high temperature (hexagonal) wurtzite phase of ZnS during the anneal. The increase in grain size of the ZnS causes a concomitant reduction in certain mechanical properties of the material, such as mechanical strength. Hence, while the HIP process increases the optical transmission of the material, it also reduces the strength of the material.

As a result of the foregoing, while CVD-processed, HIP-treated ZnS is suitable for many applications, it is not optimal for applications requiring high mechanical strength. One such application is in the optical windows and domes used in the infrared imaging components of missile systems (sometimes referred to as long wave-infrared (LWIR) and semi-active laser domes). In these applications, the window material is required to have high optical transmission in both the visible and infra-red regions (and in particular, over a wavelength range of between 0.4 micron and 12 micron) of the electromagnetic spectrum. The material is also required to possess high mechanical strength so that it can, for example, withstand erosion and damage due to the impact of high velocity water droplets, sand, and other particulates.

To date, only a small group of materials are known that have the optical and mechanical properties that make them candidates for this type of application. These materials include zinc sulfide, zinc selenide, germanium, gallium arsenide, gallium phosphide, mercury cadmium telluride and cadmium telluride. Generally, all of the aforementioned materials, as produced by conventional methods in the art, are brittle, have relatively low thermal shock resistance, and have relatively low resistance to erosion and damage due to the impact of high velocity water droplets, sand, and other particulates. Notwithstanding its suboptimal mechanical strength, CVD-processed, HIP-treated ZnS is still the material of choice for this application, mostly for want of better alternatives.

Ternary sulfide materials, such as calcium lanthanum sulfide, are also currently being developed for IR applications, particularly in the 0.5-12 micron region of the spectrum. While these ternary sulfide materials provide some improvement in durability, even these materials are susceptible to deterioration in mechanical stability and optical performance when exposed to the harsh environments required by the imaging domes and windows of a missile.

In light of the foregoing, a need exists in the art for materials (and methods for producing the same) which have high mechanical strength and high optical transmission in both the visible and infra-red regions of the electromagnetic spectrum (and in particular, over a wavelength range of between 0.4 microns and 12 microns in the infrared region of the spectrum). In particular, a need exists in the art for materials (and methods for producing the same) which are suitable for use in the windows and domes of missile imaging systems. These and other needs may be met by the materials, methodologies and systems disclosed herein.

It has now been found that the foregoing needs may be addressed through the provision of systems and methodologies which utilize spark plasma sintering (SPS), in conjunction with hot pressing, to produce nano-grain materials. Materials may be produced by these systems and methodologies which are based on metal sulfides, metal selenides (such as, for example, ZnS) and other such materials, and which are useful in a variety of applications, including optical polycrystalline ceramic windows. Materials may be produced by these systems and methodologies which have excellent optical transmission in the infrared and visible regions of the spectrum, and which exhibit improved durability compared to similar materials produced by other processes.

For example, materials such as ZnS, which may be based on spherical and monodispersed nanoparticles, may be sintered using the systems and methodologies described herein to produce articles having ultra high densities of nano-grains. These articles may exhibit improved durability and mechanical strength over their CVD-processed, HIP-treated counterparts. Consequently, the systems and methodologies described herein may be utilized to produce materials for the windows and domes of missile imaging systems which have greater resistance to high velocity rain erosion, sand erosion and other environmental factors.

In a preferred embodiment of the SPS method, the a conductive mold is filled with a starting powder material, and is placed in a vacuum chamber similar to that used in the hot press method. Preferably, the mold is made of graphite. Pressure is applied to the mold from the top and bottom using upper and lower energizing punch electrodes. At the same time, pulsed, direct current is allowed to flow through the mold through the energizing punch electrodes. A power supply for generating pulsed direct current may be utilized which is similar to the power supply used for an electrical discharge machine. The pulsed direct current may be applied at an initial stage of sintering and continuous direct current may be applied thereafter or, alternatively, a continuous pulsed direct current may be applied throughout the sintering.

The foregoing approach increases the temperature of ZnS and other sulfides or selenides, including strontium sulfide (SrS), calcium sulfide (CaS) and lead sulfide (PbS), and produces as a final product high density, nano-grain, polycrystalline materials which are free of pores or voids. This morphology may give rise to enhanced mechanical stability in comparison to similar materials produced by conventional sintering processes.

The systems and methodologies disclosed herein provide a solution to a problem which has been plaguing the art for many years, namely, the production of ZnS having both high mechanical strength and high optical transmission in the visible and infrared portions of the electromagnetic spectrum. This objective is achieved through the use of a novel process that involves spark plasma treatment of ZnS nano-sized crystalline particles under high pressure and temperature, followed by thermal annealing.

ZnS nano-sized crystalline particles used in a preferred embodiment of the systems and processes described herein may be produced from homogeneous precipitation methods using starting materials that include a Zn source and a sulfide source. Various materials may be utilized as the Zn source including, but not limited to, Zn metal, zinc acetate, or zinc acetate dehydrate, zinc acetate anhydrous, zinc carbonate, zinc nitrate, zinc nitrate hexahydrate, zinc oxide, zinc chloride, zinc chloride hydrate, zinc hydroxide, zinc citrate hydrate, zinc sulfate heptahydarate and zinc sulfate monohydarate. Various materials may be utilized as the sulfide source including, but not limited to, sulfur, sodium thiosulfate, thio-acetamide, thiourea, sodium sulfide, ammonium sulfide, lithium sulfide, potassium sulfide and hydrogen sulfide.

In a representative embodiment of the methodologies disclosed herein, prior to undergoing the spark plasma treatment, samples of ZnS were subjected to powder X-ray diffraction (XRD) and Scanning Electron Microscopy (SEM) analysis to confirm the phase purity of the ZnS and the morphology of the nano-size particles. The powder X-ray diffraction was accomplished by placing the powder samples on a glass slide and subjecting the samples to X-ray analysis. The XRD patterns of ZnS showed the presence of broad reflection peaks indicating nanostructures and corresponding to the cubic "zinc blend" crystal structure.

The X-ray diffraction peaks are shown in FIG. 1. Diffraction peak 11 corresponds to the (1, 1, 1) plane of the cubic crystalline ZnS material. Similarly, peak 12 corresponds to the (2, 2, 0) plane, and peak 13 corresponds to the (3, 1, 1) plane of the cubic crystalline ZnS material. SEM analysis showed spherical particles having diameters within the range of about 30-50 nm. After the phase purity and morphology of the nanoparticles was confirmed, the sample underwent spark plasma treatment as described below.

Figure 2:
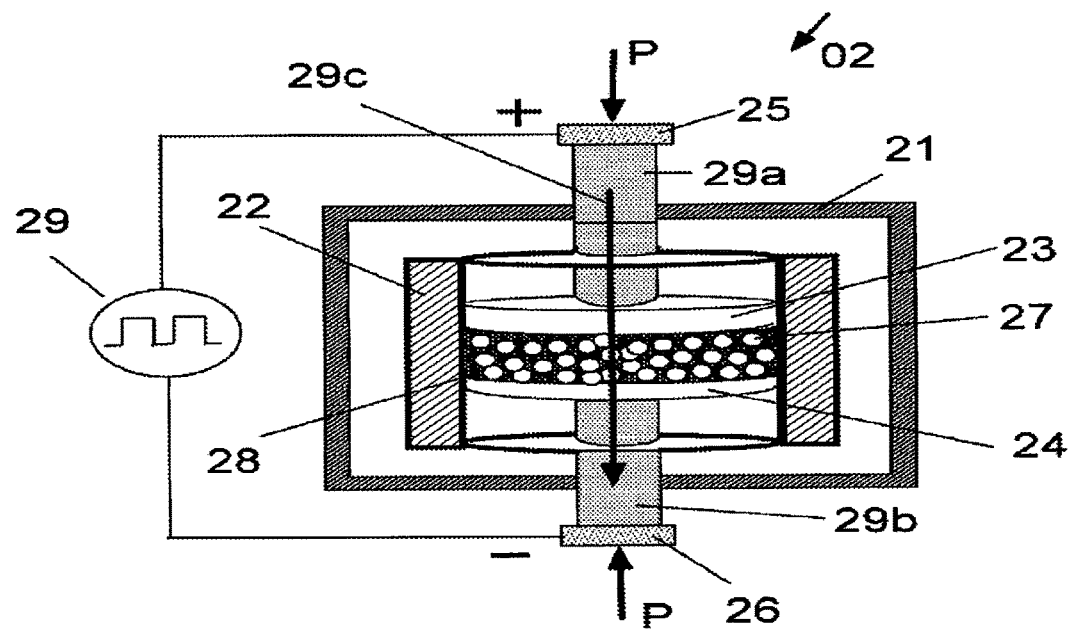
FIG. 2 is an illustration of a typical spark plasma chamber which may be utilized for spark plasma treatment of ZnS and other materials in the methodologies described herein.

The spark plasma chamber used to conduct the spark plasma treatment process is illustrated in FIG. 2. The device includes an outside chamber 21, which contains an inside active plasma chamber 22. The active plasma chamber comprises a top punch 23 and a bottom punch 24. The top punch 23 and the bottom punch 24 are made out of graphite to withstand high temperature. A top punch holder 29a and a bottom punch holder 29b are attached to electrodes 25 and 26, respectively. Electrode 25 serves as the anode, and electrode 26 serves as the cathode. A first electrically conductive path exists which extends from electrode 25 to top punch 23. Similarly, a second electrically conductive path exists which extends from electrode 26 to bottom punch 24.

Electrodes 25 and 26 are connected to a pulse DC current source 29. The space between the top punch 23 and the bottom punch 24, called the active chamber, is filled with crystalline nanoparticles 27 (in this particular example, the nanoparticles 27 are ZnS nanoparticles). A spark plasma 28 is created between the particles intermittently as a result of a pulsating current supplied by the current source 29. The main plasma current 29c flows from the anode 25 to the cathode 26. Pressure P is applied continuously to the top punch 23 and the bottom punch 24 through the punch holder 29a and 29b. The active plasma chamber is kept at a high temperature. For the sake of simplicity, certain elements, such as the heat control and hydraulic pressure mechanisms, have been omitted from FIG. 2.

The nano-size particles of crystalline ZnS were sintered using the spark plasma apparatus shown in FIG. 2. The conditions under which sintering was performed are as follows.

Prior to heating, the active chamber containing the particles was evacuated, and the inside of the active chamber and the space between the chambers 21 and 22 was flushed with argon gas. For the sake of simplicity, the vacuum system, argon injection and heat control systems are not shown in FIG. 2.

The active chamber was heated at a rate of 60° C. to 90° C./min to a temperature in the range of 450° C. to 600° C. A pressure in the range of 70 MPa to 120 MPa was applied to the top punch 23 and bottom punch 24.

The active chamber and the space between the top punch 23 and the bottom punch 24 was further heated to a temperature in the range of 600° C. to 820° C. 750° C. The pressure applied to the top punch 23 and bottom punch 24 was maintained within the range of range of 70 MPa to 120 MPa. A vacuum of 10 Pascal was maintained in the active chamber.

Voltage pulses were applied at these conditions between electrode 25 and electrode 26, thus creating a spark plasma in the spaces between the particles. The plasma current is controlled by the current source 29 which initiated the voltage pulses. This plasma creates filamentary currents at high density around the particles, causing them to melt and resulting in 'grain-welding' or sintering between the particles. Since the spark plasma momentarily creates a high current density around the particles, joule heating at the core of the particles is not substantially affected. This phenomenon prevents substantial growth of the grain size.

The intermittent spark plasma is maintained for a duration in the range of 1 minute to 5 minutes. The power is turned off after this treatment.

Figure 3:
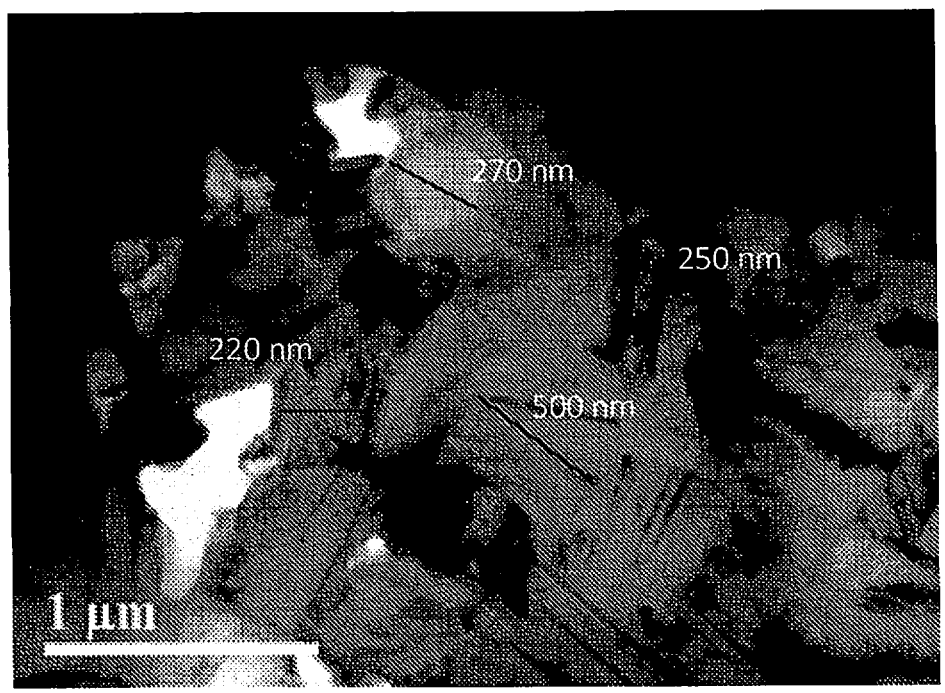
FIG. 3 is a transmission electron micrograph image of ultra-high density of cubic ZnS formed by spark plasma treatment in accordance with the teachings herein.

FIG. 3 shows a transmission electron micrograph (TEM) image of ultra-high density cubic ZnS formed that underwent the spark plasma treatment. Nano-grains ranging from 220 nm to 500 nm can be seen in the electron micrograph.

The ZnS treated with the spark plasma exhibits high mechanical strength, but may be less optically transmissive than desired. The optical transmission may be improved, both in visible wavelengths as well as in infra-red wavelengths in the range of 0.4 micron and 12 micron, through a suitable thermal annealing step.

While the ultra-high densification of nanoparticles obtained through spark plasma treatment has been described above with reference to its use with ZnS nanoparticles, one skilled in the art will appreciate that this process may be utilized with various other materials. Such materials include, but are not limited to, calcium lanthanum sulfides (e.g., $CaLa_2S_4$), CaS, SrS, PbS, $CaF_2$, $SrF_2$, $ZnF_2$, $Ga_2S_3$, zinc selenide, Gallium phosphide, spinel ($MgAl_2O_4$, Magnesium Aluminum Oxide) and aluminum oxynitride (ALON).

Sintered and annealed ceramic windows made through the use of the systems and methodologies described herein may be supplemented with coatings to further enhance their properties and to provide increased protection. An anti-reflective coating, for example, may be applied to minimize the reflection of infrared radiation and to thereby cause more of the radiation to pass through the window. Examples of coating materials that may be utilized for this purpose include, but are not limited to, low refractive index materials, particularly yttria, silica, magnesium fluoride, calcium fluoride, zinc fluoride, zinc selenide, and hafnium oxide. Multiple antireflective coatings may also be used.

In some applications, a coating that will transmit visible radiation in addition to the infrared radiation may be desired. Examples of coating materials that may be utilized for this purpose include, but are not limited to, leaded glass and zinc selenide. Alternatively, or in addition, coatings for scratch or erosion resistance may be applied, particularly for enhanced protection against rain, blowing sand, and particle impacts in general. Materials with a high damage threshold velocity, such as gallium phosphide, sapphire, spinel, and aluminum oxynitride (ALON), may also be used.

It will be appreciated from the foregoing that the process of ultra-high densification of nanocrystals of ZnS through spark plasma treatment under high pressure and temperature, followed by thermal annealing, may be utilized to obtain ZnS materials which have high mechanical strength and high optical transmission. These materials may be utilized in various articles, including the windows and domes employed in missile systems and in other infra-red imaging and sensing devices. This methodology may also be applied to other materials, including those listed above, and these materials may be utilized in various applications where mechanical strength and optical transmission, and resistance to a hostile environment are desirable.

The discussion above has focused primarily on the production of materials for use in the windows and domes of infrared imaging systems aboard missiles. In this application, these materials may be used to effectively shield the imaging device from the external environment, while providing the desired optical transparency over wavelengths of interest. However, it will be appreciated that the materials produced by the systems and methodologies described herein may be utilized for a variety of other purposes. For example, these materials may be utilized to make a variety of constructs, including various windows and lenses (including, for example, Fresnel lenses). Moreover, these various constructs may be utilized in a variety of end uses such as, for example, IR imaging, security, and surveillance applications. Such constructs may also be used in devices designed for these applications such as, for example, far infrared cameras, far infrared sensors, and thermal imagers.

Nanoparticles of varying dimensions may be utilized in the systems and methodologies disclosed herein. Preferably, these nanoparticles have an average diameter or average maximum dimension within the range of about 10 nm to about 100 nm, more preferably within the range of about 30 nm to about 50 nm, and most preferably within the range of about 35 nm to about 45 nm. While these nanoparticles may have various shapes and morphologies, they are preferably spherical and crystalline or polycrystalline.

Various thermal and barometric profiles may be used in the sintering chamber prior to or during sintering. Preferably, the chamber is heated in at least two steps. In the first step, the chamber is preferably heated to a first temperature at a rate of about 30° C. to about 120° C./min, and more preferably at a rate of about 60° C. to about 90° C./min. The first temperature is preferably in the range of about 450° C. to about 600° C., and more preferably in the range of about 500° C. to about 550° C. During the first step, a pressure is applied to the top and bottom punches of the chamber which is preferably in the range of about 70 MPa to about 120 MPa, and more preferably in the range of about 90 MPa to about 110 MPa.

In the second step, the chamber is preferably heated to a temperature within the range of about 500° C. to about 850° C., more preferably to a temperature within the range of about 600° C. to about 750° C., and most preferably to a temperature within the range of about 650° C. to about 700°

C. During the second step, the pressure within the chamber is preferably maintained at a value within the range of about 5 Pascal to about 20 Pascal, more preferably at a value within the range of about 5 Pascal to about 15 Pascal, and most preferably at about 10 Pascal.

During sintering, the voltage pulses may be applied for various durations to create a spark plasma. Preferably, the voltage pulses are applied for durations within the range of about 30 second to about 10 minutes, and more preferably for durations of about 1 minute to about 5 minutes.

The systems and methodologies described herein may be utilized to produce products having nano-grains of various dimensions. Preferably, these nano-grains have an average maximum dimension within the range of about 100 nm to about 800 nm, more preferably within the range of about 200 nm to about 600 nm, and most preferably within the range of about 220 nm to about 500 nm.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

We claim:

1. A process for producing mechanically stable, infra-red and visible light transmissive ZnS disc, comprising:
    disposing ZnS nano-particles between two conductive electrodes kept under vacuum inside a chamber;
    said nano-particles being subjected to programmed DC plasma treatment that impresses pulse DC current at the start of process and continuous DC current thereafter, resulting in heating of nano-particle;
    said chamber being heated gradually and taken through a programmed thermal and pressure cycle;
    said thermal cycle and pressure cycle having a temperature increase rate in the range of 60° C./min to 90° C./min and pressure in the range of 70 MPa to 120 Mpa;
    said nano-particles being subjected to thermal annealing at the end of pulsed DC plasma treatment resulting in a rigid ZnS planar disc having densely packed ZnS particles with large grain sizes greater than 220 nm;
    said ZnS disc being coated with optical anti-reflective coating followed by a protective coating and thus ready for use in various infra-red window applications.

2. The process according to claim 1 wherein the size of ZnS nano-particles prior to the process is in the range of 30 to 50 nm.

3. The process according to claim 1 wherein the said ZnS disc contains ZnS nano-particles whose grain size, after the process is in the range of 220 to 500 nm.

4. The process according to claim 1 wherein the said ZnS disc is used in applications such as infra-red cameras, infra-red sensors, thermal imagers, Fresnel lenses, Fighter Aircraft infra-red windows.

5. The process according to claim 1 wherein the said programmed thermal cycle has a temperature increase rate of 60° C./min up to 450° C. and again with 60° C./min up to 600° C. with applied pressure of 70 Mpa.

6. The process according to claim 1 wherein the said programmed thermal cycle has a temperature increase rate of 90° C./min in up to 600° C. and again with 90° C./min up to 750° C. with applied pressure of 120 Mpa.

* * * * *

UNITED STATES PATENT AND TRADEMARK OFFICE
CERTIFICATE OF CORRECTION

PATENT NO. : 9,575,219 B2  
APPLICATION NO. : 13/371187  
DATED : February 21, 2017  
INVENTOR(S) : Duraiswamy Ravichandran and Devan Balachari It is certified that error appears in the above-identified patent and that said Letters Patent is hereby corrected as shown below:

In the Specification

Column 1 Line 11 please add the following statement:
"This invention was made with Government support under Contract no: W31P4Q-12-C-0064 awarded by Agency: Army Contracting Command - Redstone, AL. The Government has certain rights in the invention".

Signed and Sealed this  
Twenty-seventh Day of March, 2018

Andrei Iancu  
*Director of the United States Patent and Trademark Office*